(12) United States Patent
Burnett et al.

(10) Patent No.: US 8,206,054 B1
(45) Date of Patent: Jun. 26, 2012

(54) FURNITURE COUPLING ASSEMBLY

(75) Inventors: Marvin K. Burnett, Archbold, OH (US); Terry W. Armey, Napoleon, OH (US); Brian D. Fritch, Stryker, OH (US)

(73) Assignee: Sauder Woodworking Co., Archbold, OH (US)

( * ) Notice: Subject to any disclaimer, the term of this patent is extended or adjusted under 35 U.S.C. 154(b) by 45 days.

(21) Appl. No.: 12/854,412

(22) Filed: Aug. 11, 2010

Related U.S. Application Data

(60) Continuation-in-part of application No. 12/833,056, filed on Jul. 9, 2010, which is a division of application No. 11/903,232, filed on Sep. 21, 2007, now abandoned.

(51) Int. Cl.
*F16B 7/00* (2006.01)
*F16B 12/36* (2006.01)
*F16B 13/00* (2006.01)
*B25G 3/00* (2006.01)

(52) U.S. Cl. .......... 403/292; 403/293; 403/DIG. 13; 52/837; 312/263

(58) Field of Classification Search .......... 403/286, 403/292, 293, 381, 396, 410, DIG. 11, DIG. 12, 403/DIG. 13; 52/105, 583.1, 586.2, 837; 312/111, 140, 284.1, 263
See application file for complete search history.

(56) References Cited

U.S. PATENT DOCUMENTS

| | | | |
|---|---|---|---|
| 1,537,678 A | 5/1925 | Jensen | |
| 2,028,229 A | 1/1936 | Luhn | |
| 2,116,584 A | 5/1938 | Shelby | |
| 2,735,146 A | 2/1956 | Purviance | |
| 2,863,185 A | 12/1958 | Riedi | |
| 3,313,199 A * | 4/1967 | Houvener et al. | 411/21 |
| 3,336,689 A | 8/1967 | Miller | |
| 3,552,056 A | 1/1971 | Meates | |
| 3,798,867 A | 3/1974 | Starling | |

(Continued)

FOREIGN PATENT DOCUMENTS

JP 11140994 5/1999

OTHER PUBLICATIONS

Office Action issued in U.S. Appl. No. 11/903,232, mailed Apr. 7, 2009.

(Continued)

*Primary Examiner* — Michael P Ferguson
*Assistant Examiner* — Nahid Amiri
(74) *Attorney, Agent, or Firm* — MacMillan, Sobanski & Todd, LLC

(57) ABSTRACT

A furniture coupling assembly that includes a coupling having a center portion, a first portion having a first locking member, a second portion having a second locking member, a first end and a second end. The assembly further includes a first furniture member having a first member groove having a shape corresponding to the center, first and second portions of the coupling. The first furniture member has a first locking member opening positioned adjacent to the first member groove. A second furniture member of the assembly has a second member groove having a shape corresponding to the center, first and second portions of the coupling. The second furniture member has a second locking member opening positioned adjacent to the second member groove. The coupling is insertable in the first and second furniture member grooves and the first and second locking members are insertable in the first and second locking member openings, respectively, to join together the first and second furniture members.

6 Claims, 14 Drawing Sheets

U.S. PATENT DOCUMENTS

| | | | |
|---|---|---|---|
| 4,068,346 A * | 1/1978 | Binder | 16/110.1 |
| 4,093,389 A * | 6/1978 | Wibrow | 403/280 |
| 4,158,335 A * | 6/1979 | Belcastro et al. | 108/64 |
| 4,275,972 A | 6/1981 | Bowen et al. | |
| 4,407,106 A | 10/1983 | Beck | |
| 5,090,835 A | 2/1992 | Cox | |
| 5,380,119 A * | 1/1995 | Hadden | 403/402 |
| 5,433,416 A | 7/1995 | Johnson | |
| D384,271 S | 9/1997 | Kozyrski | |
| 6,227,754 B1 | 5/2001 | von Nessen-Lapp et al. | |
| 6,341,467 B1 | 1/2002 | Wycech | |
| 6,357,960 B1 | 3/2002 | Cornelius et al. | |
| 6,578,341 B2 | 6/2003 | Hoffmann et al. | |
| 6,598,542 B2 * | 7/2003 | Goldberg et al. | 108/64 |
| 6,729,091 B1 * | 5/2004 | Martensson | 52/391 |
| 6,874,291 B1 | 4/2005 | Weber | |
| 7,331,781 B1 * | 2/2008 | Bandeen | 433/7 |
| 7,398,622 B2 * | 7/2008 | Walker | 52/204.69 |
| 2006/0165484 A1 | 7/2006 | Walker | |

OTHER PUBLICATIONS

Office Action issued in U.S. Appl. No. 11/903,232, mailed Apr. 15, 2010.

* cited by examiner

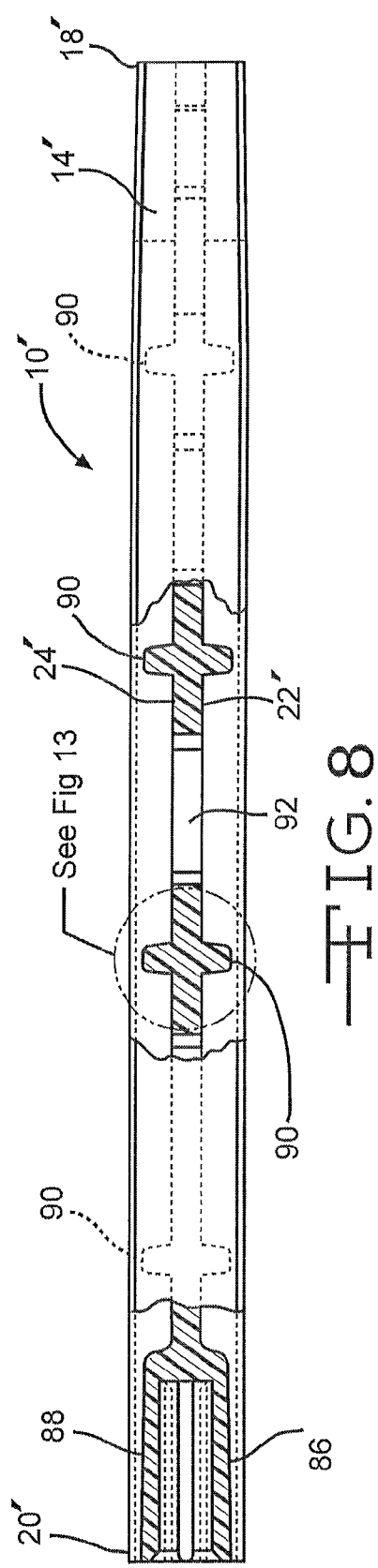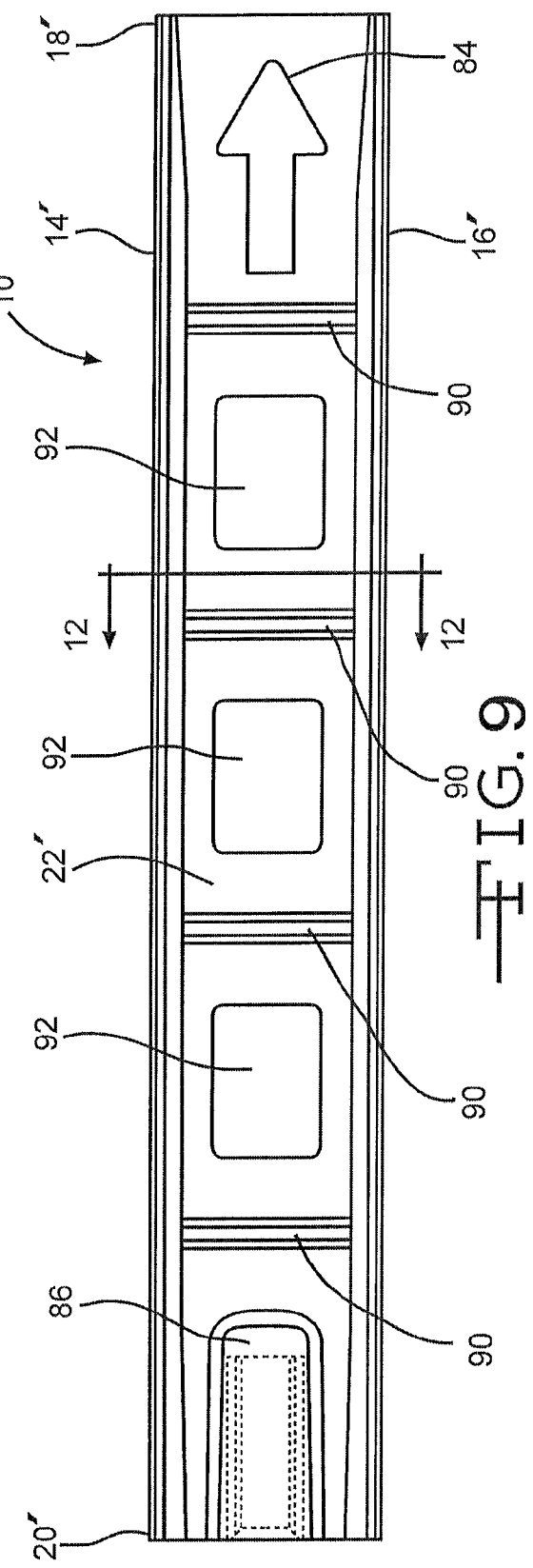

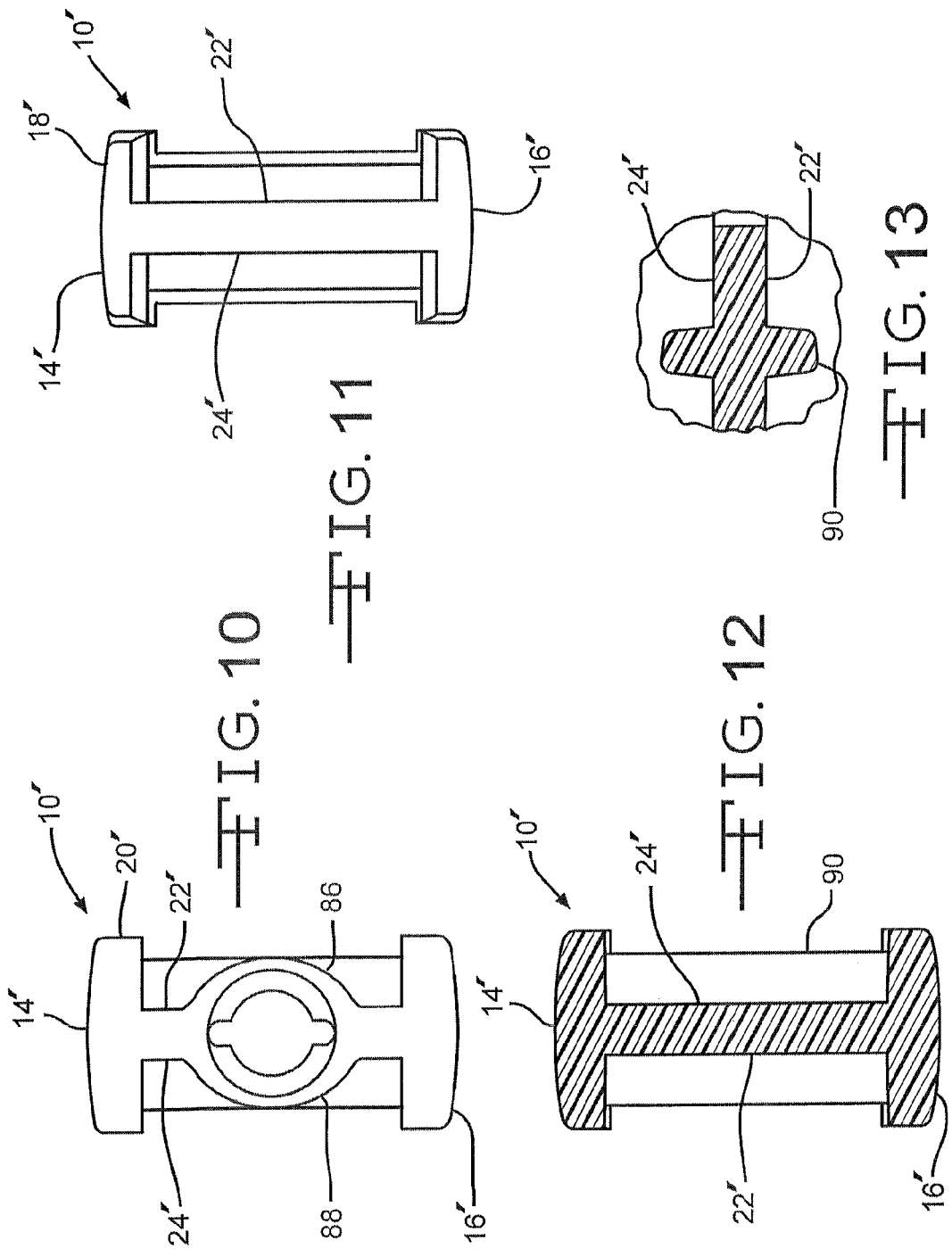

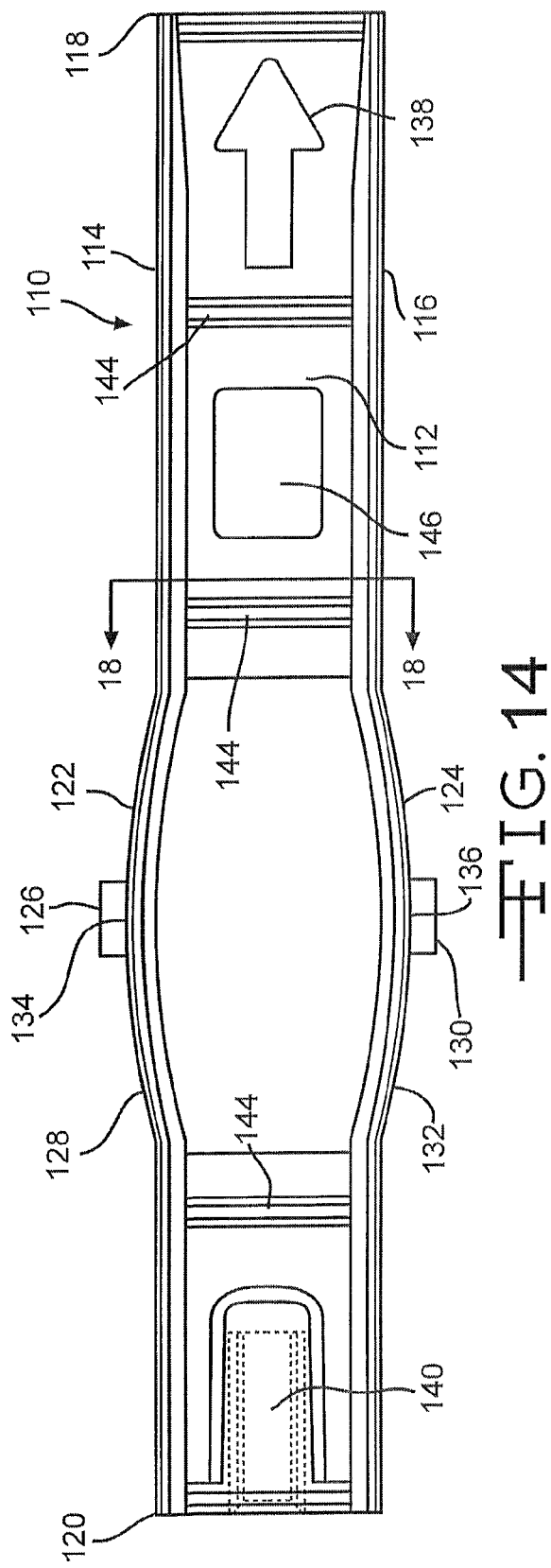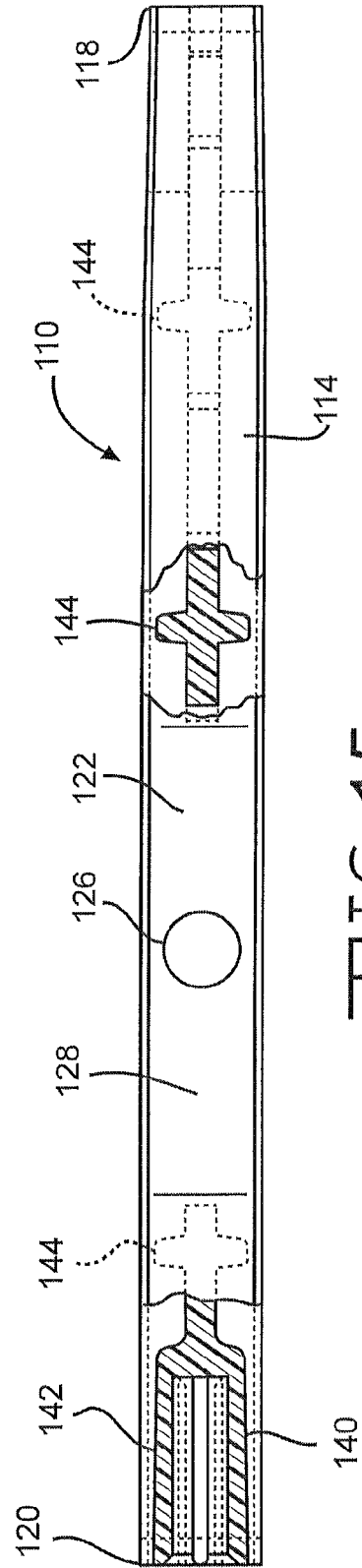

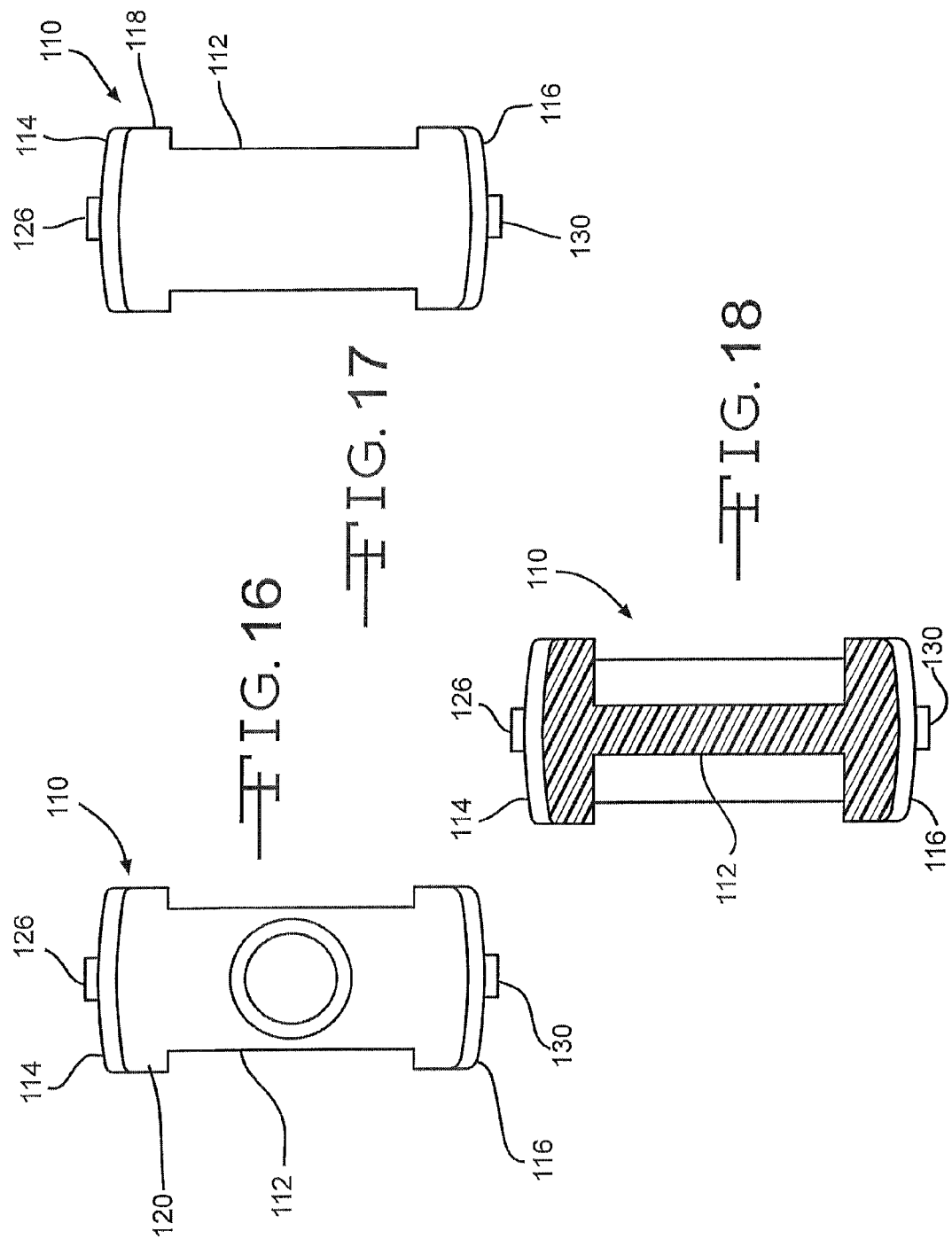

US 8,206,054 B1

FURNITURE COUPLING ASSEMBLY

CROSS-REFERENCE TO RELATED APPLICATIONS

This is a continuation-in-part of U.S. patent application Ser. No. 12/833,056, which was filed on Jul. 9, 2010, which is a division of U.S. patent application Ser. No. 11/903,232, now abandoned, which was filed on Sep. 21, 2007.

TECHNICAL FIELD

The invention is generally related to a furniture coupling assembly. More specifically, the invention is directed to a coupling for joining together furniture members.

BACKGROUND OF THE INVENTION

Ready-to-assemble (RTA) furniture consists of manufactured furniture members that are sold to consumers in an unassembled condition. The consumer assembles the members to construct furniture items such as bookcases, storage cubes, desks, tables and stands.

RTA furniture has been assembled using common fasteners such as screws, bolts, dowel pins and cam and dowel assemblies. The assembly of the furniture members is often complicated and requires the use of tools. The invention provides a coupling that can quickly and easily join together furniture members without the use of tools.

The shapes of RTA furniture components, such as table legs, have been limited due to manufacturing processes. For example, square components are difficult to manufacture because of the limits in wrapping laminate on all four sides of the component. Further, it is difficult to manufacture components that are round because there is no flat surface to reference for lamination. By producing two members wrapped on only three sides with a slight return wrap, the two members can be brought together to form square or round components. The invention provides a furniture coupling assembly having a coupling that can quickly and easily join together furniture members to form square and round furniture components.

BRIEF SUMMARY OF THE INVENTION

A furniture coupling assembly that includes a coupling having a center portion, a first portion having a first locking member, a second portion having a second locking member, a first end and a second end. The assembly further includes a first furniture member having a first member groove having a shape corresponding to the center, first and second portions of the coupling. The first furniture member has a first locking member opening adjacent to the first member groove. A second furniture member of the assembly has a second member groove having a shape corresponding to the center, first and second portions of the coupling. The second furniture member has a second locking member opening positioned adjacent to the second member groove. The coupling is insertable in the first and second furniture member grooves and the first and second locking members are insertable in the first and second locking member openings, respectively, to join together the first and second furniture members.

BRIEF DESCRIPTION OF THE DRAWINGS

FIG. 8 is a side elevational view of an alternative embodiment coupling according to the invention;

FIG. 9 is a top plan view of the coupling shown in FIG. 8 with portions broken away to show the ribs;

FIG. 10 is a back elevational view of the coupling shown in FIG. 8;

FIG. 11 is a front elevational view of the coupling shown in FIG. 8;

FIG. 12 is a cross-sectional view taken along line 12-12 of FIG. 8;

FIG. 13 is an enlarged view as shown in FIG. 9;

FIG. 14 is side elevational view of an alternative embodiment coupling according to the invention;

FIG. 15 is a top plan view of the coupling shown in FIG. 14 with portions broken away to show the ribs;

FIG. 16 is a back elevational view of the coupling shown in FIG. 14;

FIG. 17 is a front elevational view of the coupling shown in FIG. 14;

FIG. 18 is a cross-sectional view taken along line 18-18 of FIG. 14;

DETAILED DESCRIPTION OF THE INVENTION

Figure 1:
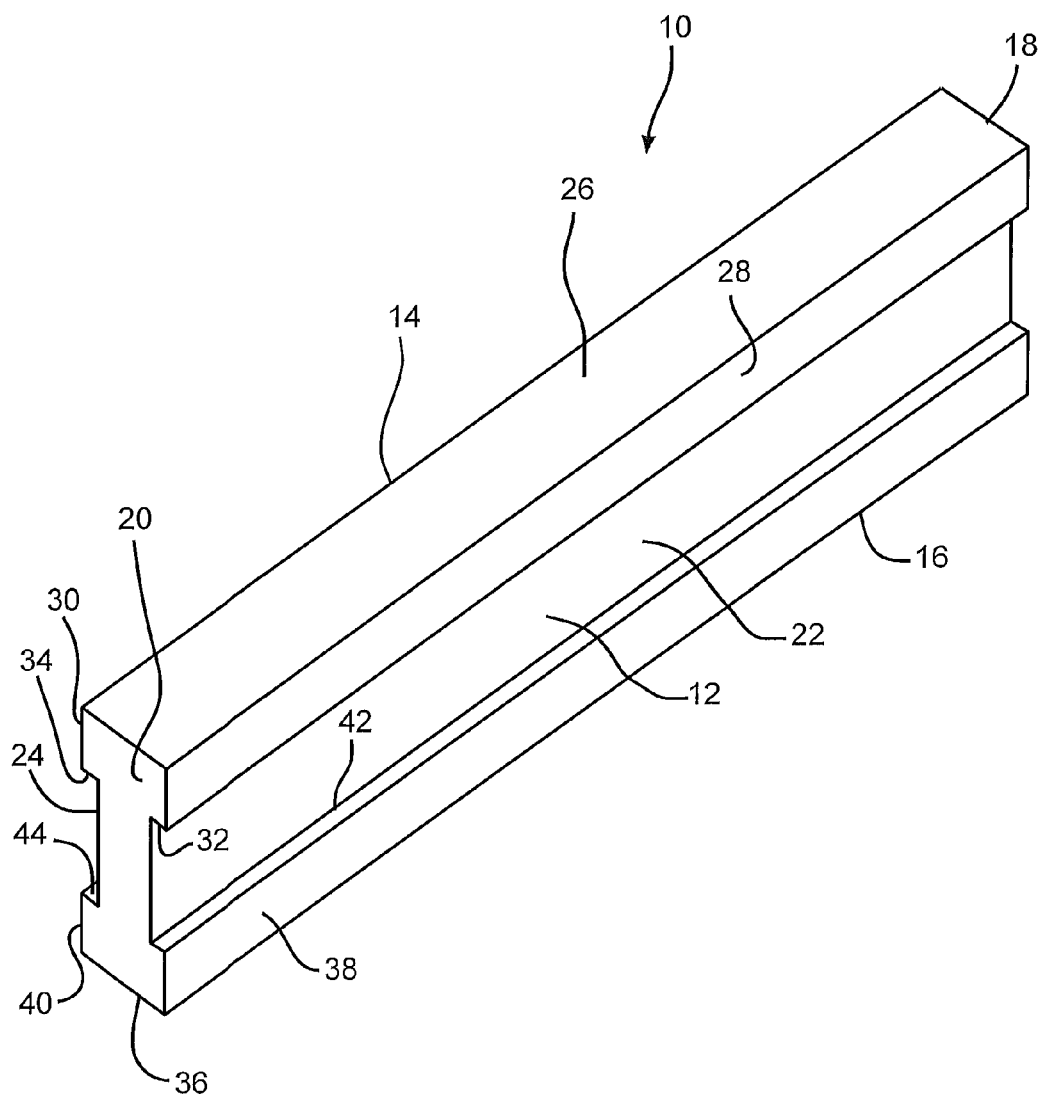
FIG. 1 is a perspective view of a coupling according to the invention.

Referring to FIG. 1, the coupling 10 has a center portion or center plate 12, a first portion or first plate 14, a second portion or second plate 16, a first end 18 and a second end 20. The center portion 12 has a first wall 22 and a second wall 24. In an embodiment, the first and second walls 22 and 24 are substantially parallel.

Still referring to FIG. 1, the first portion 14 has a first portion outside surface 26, a first portion first side surface 28, a first portion second side surface 30, a first portion first inside surface 32 and a first portion second inside surface 34. The second portion 16 has a second portion outside surface 36, a second portion first side surface 38, a second portion second side surface 40, a second portion first inside surface 42 and a second portion second inside surface 44.

The center portion 12, the first portion 14, the second portion 16, the first end 18 and the second end 20 of the coupling 10 can have various configurations, shapes and sizes. In an embodiment, as shown in FIG. 1, the first portion outside surface 26 is substantially perpendicular to the first portion first and second side surfaces 28 and 30 and the first portion outside surface 26 is substantially parallel to the first portion first and second inside surfaces 32 and 34. The second portion outside surface 36 is substantially perpendicular to the second portion first and second side surfaces 38 and 40 and the second portion outside surface 36 is substantially parallel to the second portion first and second inside surfaces 42 and 44. The first wall 22 of the center portion 12 is substantially perpendicular to the first portion outside surface 26, the first portion first inside surface 32, the second portion first inside surface 42 and the second portion outside surface 36. The first wall 22 is substantially parallel to the first portion first side surface 28 and the second portion first side surface 38. The first wall 22 is spaced inwardly from the first portion first side surface 28 and the second portion first side surface 38. The second wall 24 of the center portion 12 is substantially perpendicular to the first portion outside surface 26, the first portion second inside surface 34, the second portion second inside surface 44 and the second portion outside surface 36. The second wall 24 is substantially parallel to the first portion second side surface 30 and the second portion second side surface 40. The second wall 24 is spaced inwardly from the first portion second side surface 30 and the second portion second side surface 40.

In the embodiment shown in FIG. 1, the coupling 10 has an I-shape. The center portion 12, the first portion 14 and the second portion 16 have substantially rectangular shapes. The coupling 10 is elongated between the first and second ends 18 and 20.

The coupling 10 can be made of various natural and synthetic materials such as wood, plastic, metal and fiberglass. An example of a plastic material is polyethylene.

Figure 2:
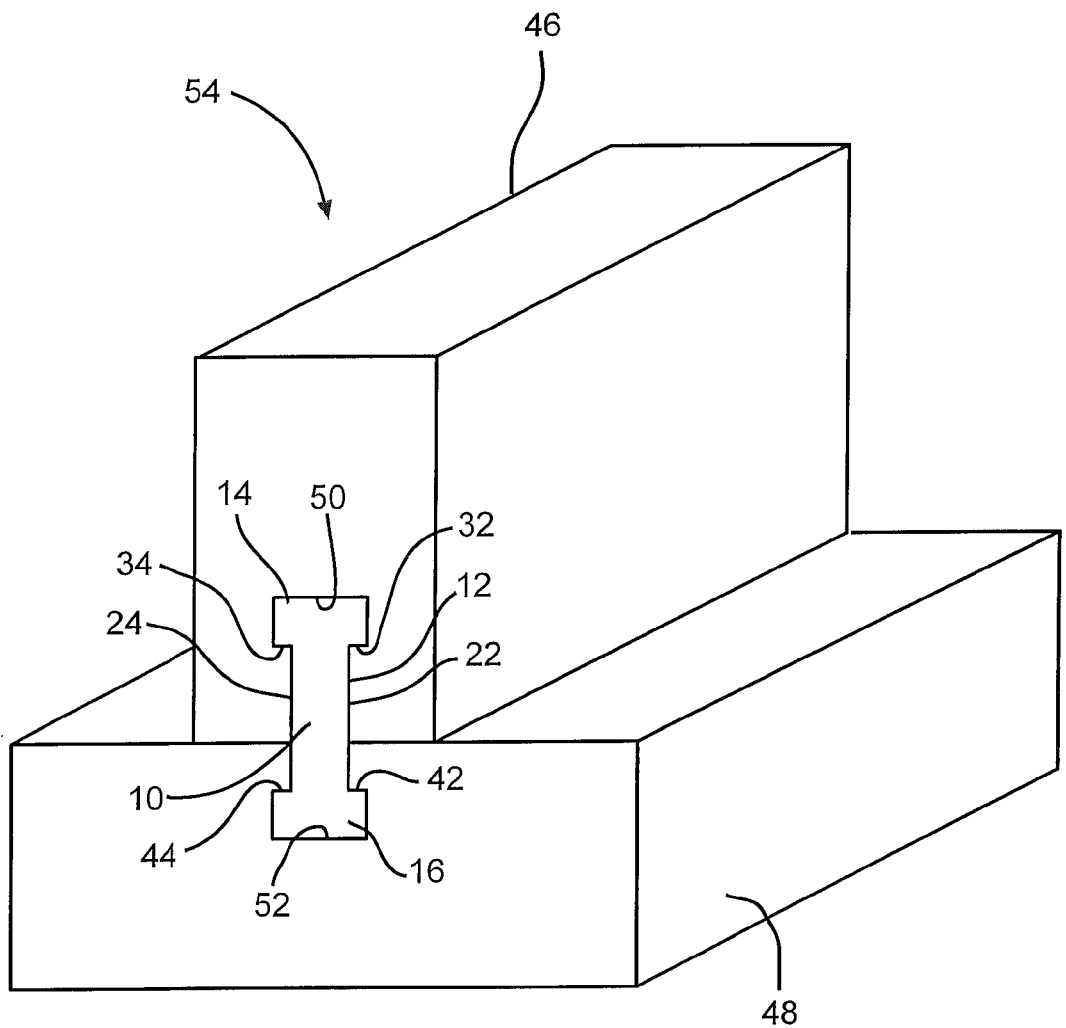
FIG. 2 is a perspective view of two furniture members joined together by a coupling according to the invention.

Referring to FIGS. 2-7, various furniture assemblies that use the coupling 10 are shown. In FIG. 2, a first furniture member 46 and a second furniture member 48 are joined together by the coupling 10. The first furniture member 46 includes a first member groove 50 that has a shape corresponding to the shapes of the center portion 12 and the first portion 14 of the coupling 10. The second furniture member 48 includes a second member groove 52 that has a shape corresponding to the shapes of the center portion 12 and the second portion 16 of the coupling 10. The coupling 10 is inserted in the first and second member grooves 50 and 52. The first and second walls 22 and 24 of the coupling 10 prevent horizontal movement of the first and second furniture members 46 and 48. The inside surfaces 32, 34, 42 and 44 of the coupling 10 prevent vertical movement of the first and second furniture members 46 and 48. The embodiment shown in FIG. 2 is directed to a furniture assembly 54, such as an RTA furniture assembly, having two members. It should be understood that two or more furniture members can be joined by one or more couplings to form a furniture assembly without tools.

The first and second furniture members 46 and 48 can be made of natural or synthetic materials. Examples of natural materials include solid wood, wood particles and various grasses such as straw. Examples of synthetic materials include plastic such as fiberglass reinforced plastic. The natural or synthetic materials can be covered with laminate, paint, stain, varnish or other surface coatings.

Figure 3:
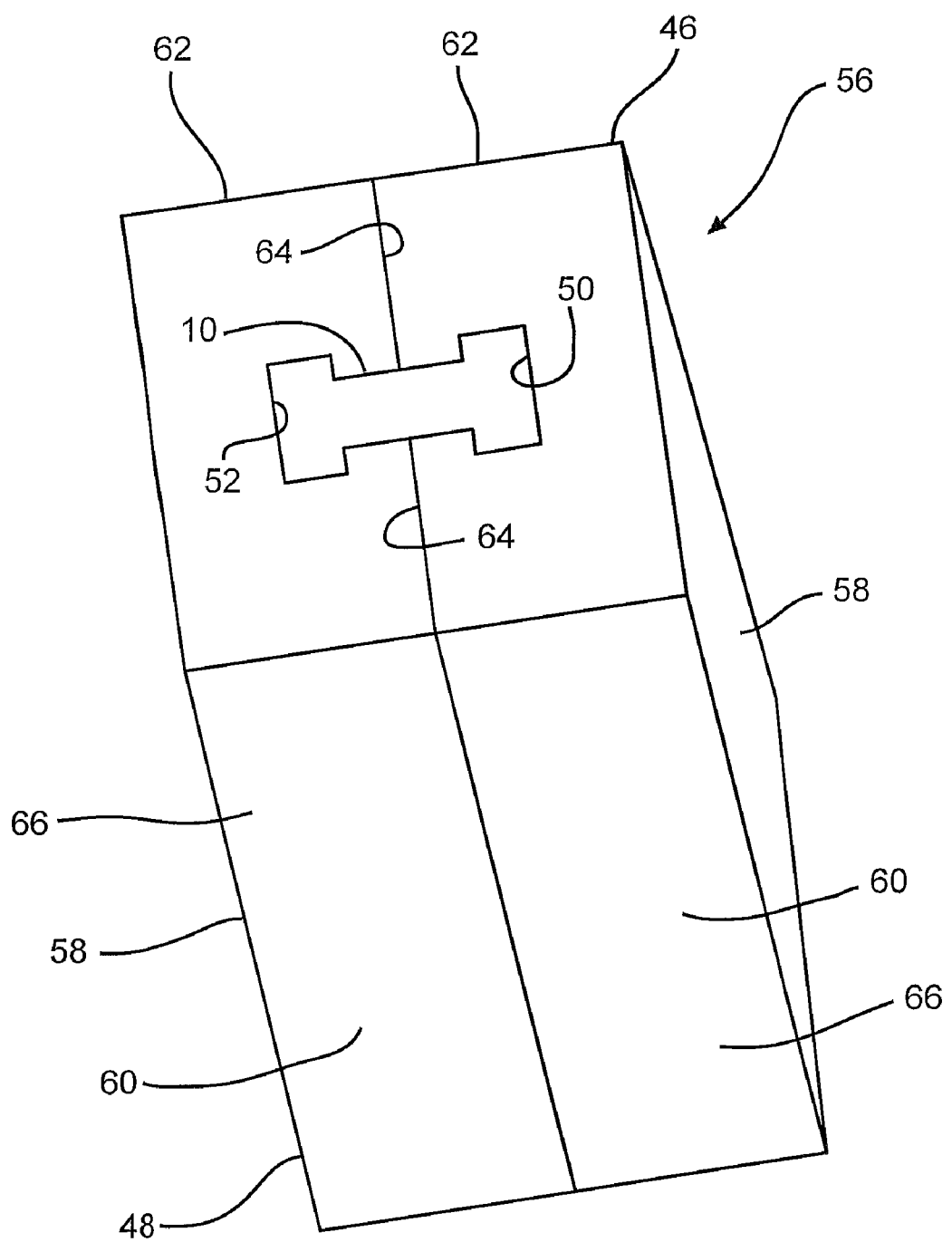
FIG. 3 is a perspective view of two furniture members joined together by a coupling according to the invention to form a substantially square furniture assembly.

An alternative embodiment furniture assembly 56 is shown in FIG. 3. The assembly 56 has a substantially rectangular first furniture member 46 including a first member groove 50, a substantially rectangular second furniture member 48 including a second member groove 52 joined together by a coupling 10. Each furniture member 46 and 48 includes an outside surface 58, a first side surface 60, a second side surface 62 and an inside surface 64. In an embodiment, each of the furniture members 46 and 48 is covered with a laminate 66 on the outside, first side and second side surfaces 58-62 with a slight return wrap on the inside surface 64. The assembly 56 provides a substantially square, laminate covered post that can be used as, for example, a leg for a table.

Figure 4:
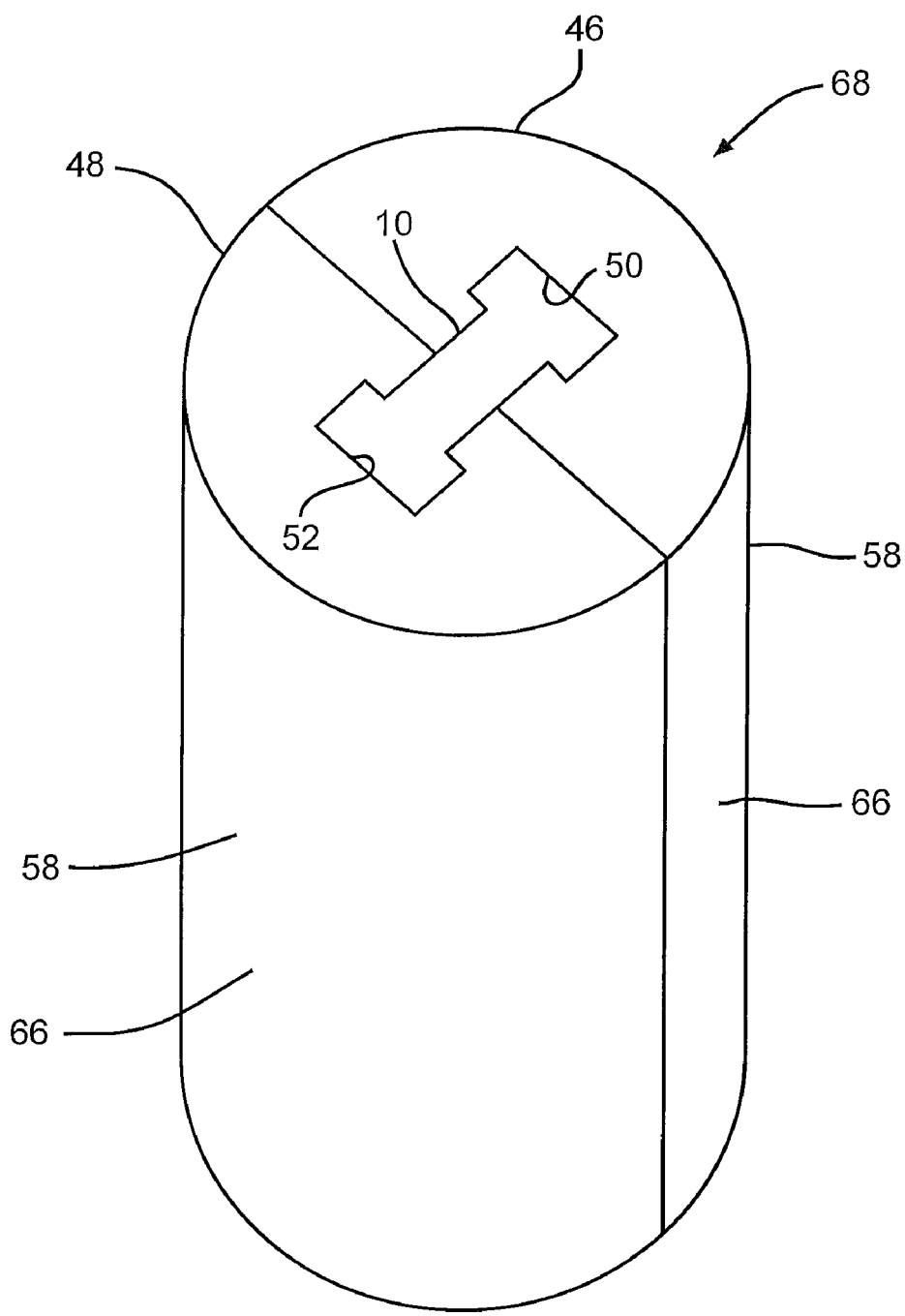
FIG. 4 is a perspective view of two furniture members joined together by a coupling according to the invention to form a substantially round furniture assembly.

Referring to FIG. 4, an alternative embodiment furniture assembly 68 is shown. The assembly 68 has a substantially semi-circular first furniture member 46 including a first member groove 50, a substantially semi-circular second furniture member 48 including a second member groove 52 joined together by a coupling 10. Each furniture member 46 and 48 includes an outside surface 58 and an inside surface 64. In an embodiment, each of the furniture members 46 and 48 is covered with a laminate 66 on the outside surface 58 with a slight return wrap on the inside surface 64. The assembly 68 provides a substantially round, laminate covered post that can be used as, for example, a leg for a table.

Figure 5:
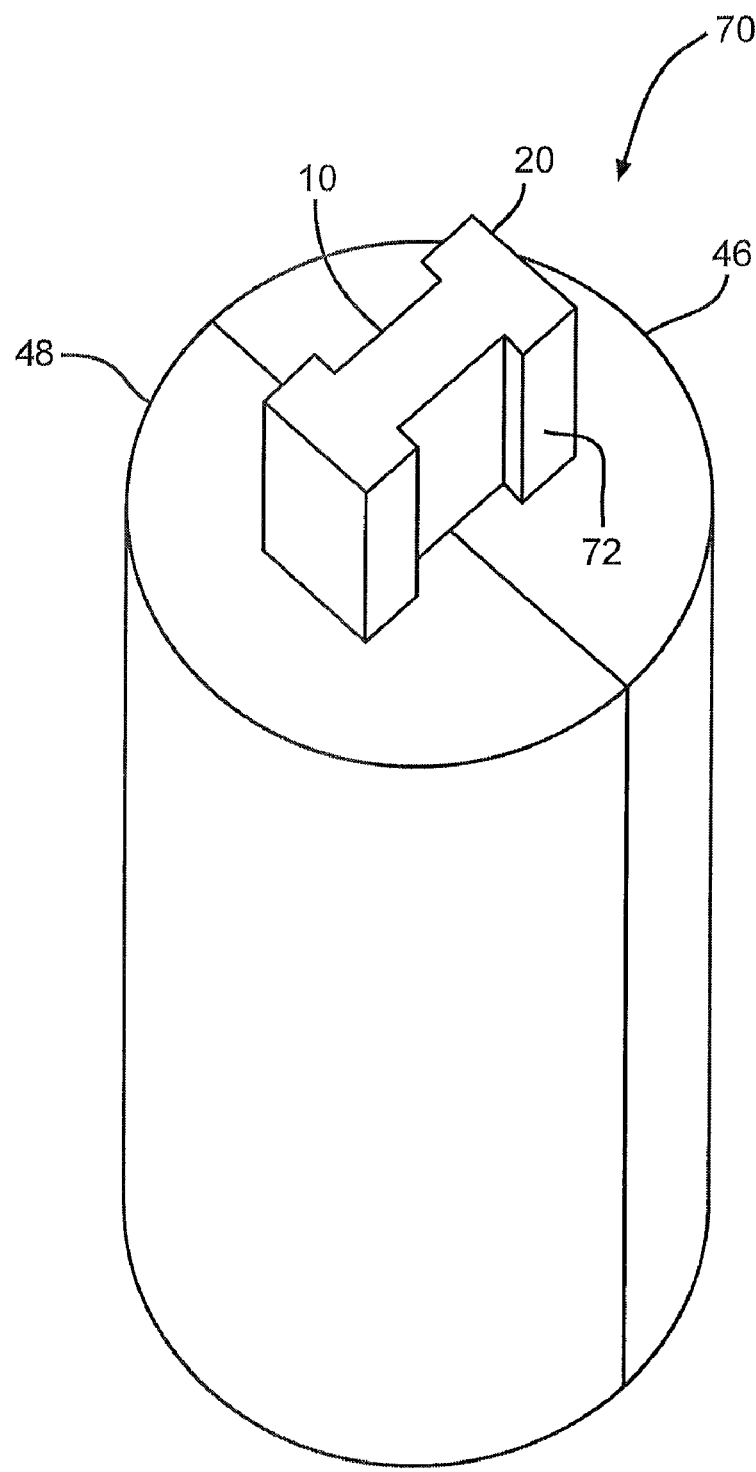
FIG. 5 is a perspective view of two furniture members joined together by a coupling according to the invention to form a furniture assembly in which the coupling extends from the assembly.

An alternative embodiment furniture assembly 70 is shown in FIG. 5. This embodiment is similar to the furniture assembly 68 of FIG. 4. In this embodiment, the second end 20 of the coupling 10 extends outwardly from the first and second furniture members 46 and 48 to form a connection portion 72. The connection portion 72 can be, for example, inserted in corresponding grooves of another structure to connect the furniture assembly 70 to the other structure.

Figure 6:
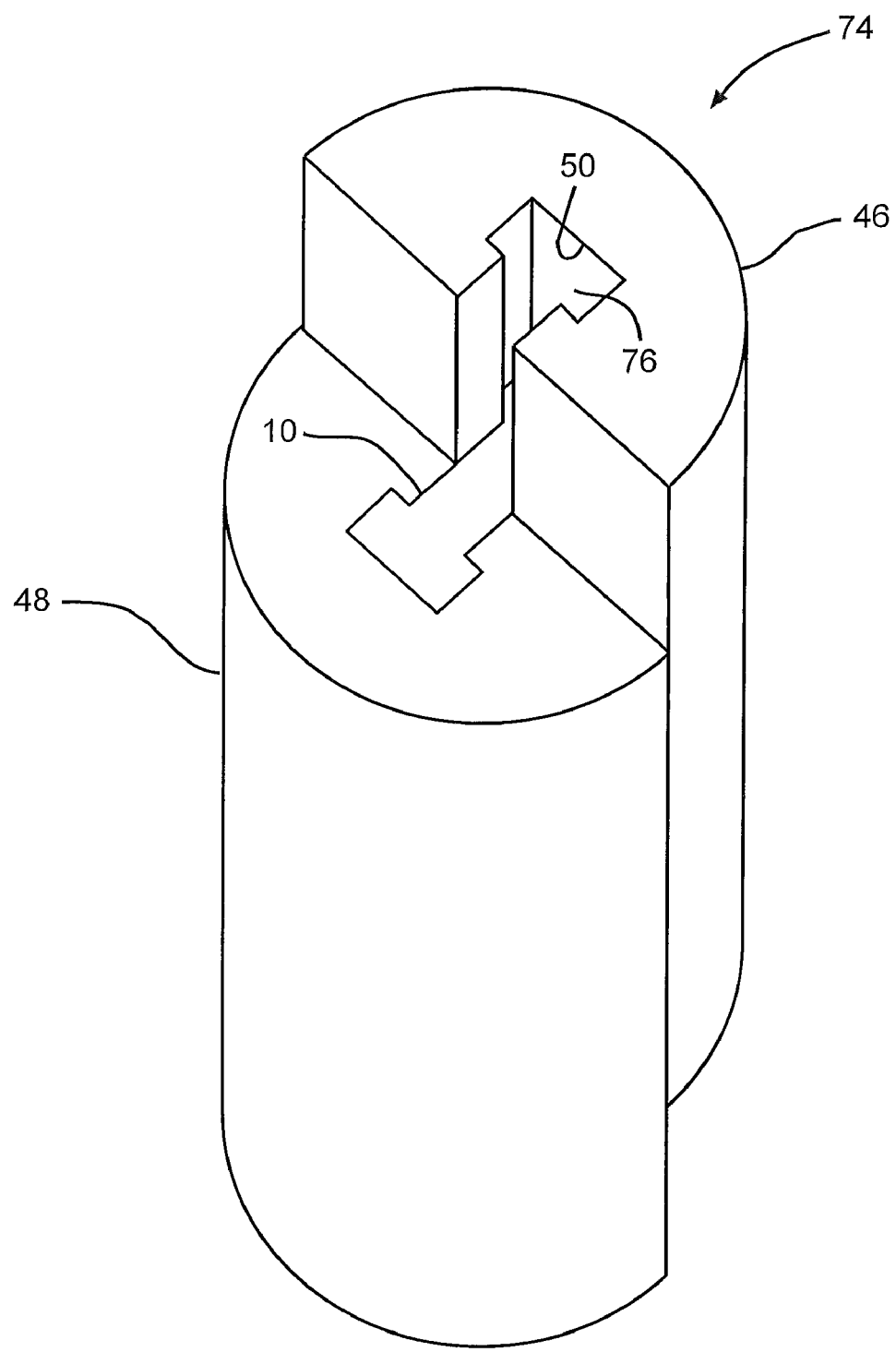
FIG. 6 is a perspective view of two furniture members joined together by a coupling according to the invention to form a furniture assembly in which the groove of one of the furniture members is open for the insertion of a coupling from another furniture assembly or another device.

Referring to FIG. 6, an alternative embodiment furniture assembly 74 is shown. This embodiment is similar to the furniture assembly 68 of FIG. 4. In this embodiment, the first groove 50 of the first furniture member 46 is open to form an attachment portion 76 for the insertion of, for example, a coupling from another furniture assembly. The attachment portion 76 can also be used, for example, for the attachment of a device.

Figure 7:
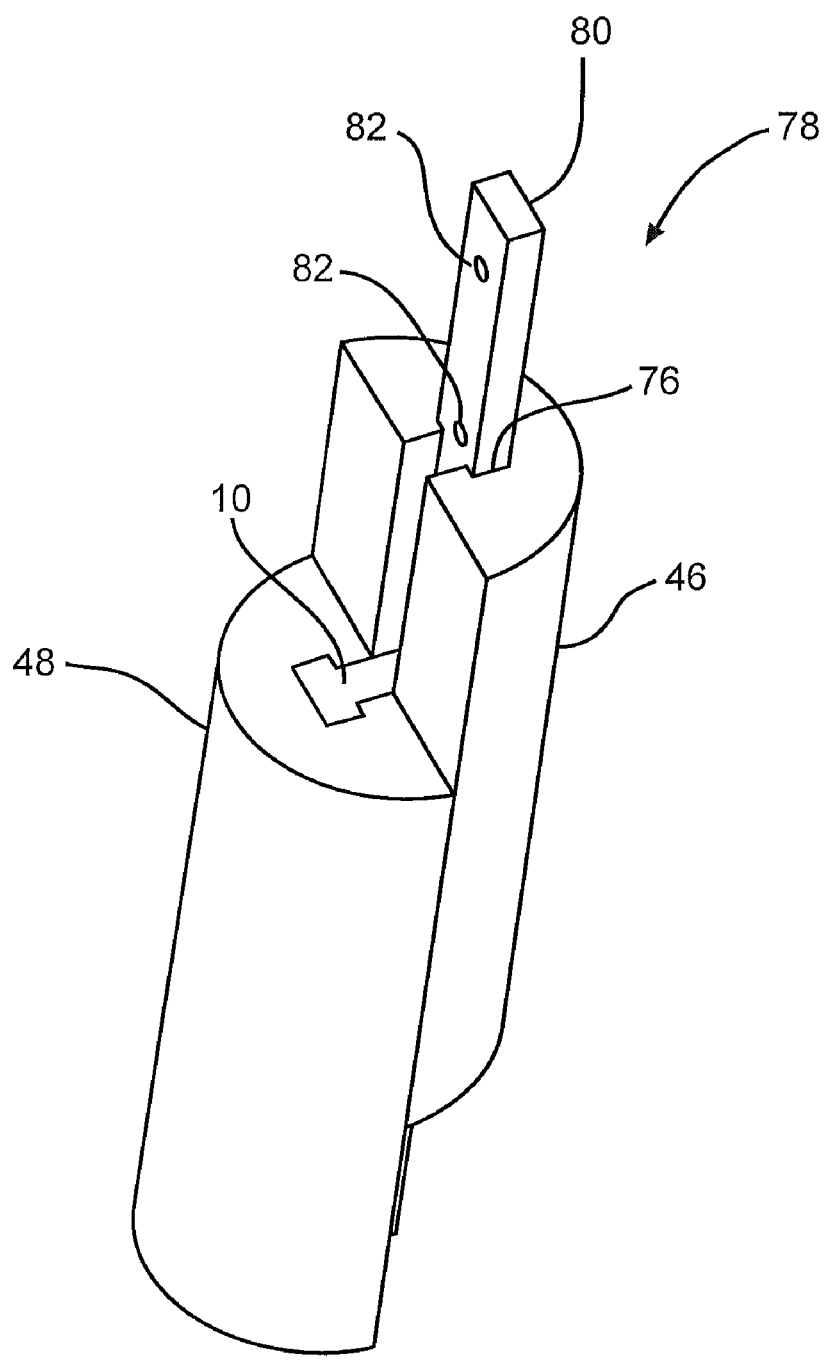
FIG. 7 is a perspective view similar to FIG. 6 showing an attachment device inserted in the groove.
Figure 19:
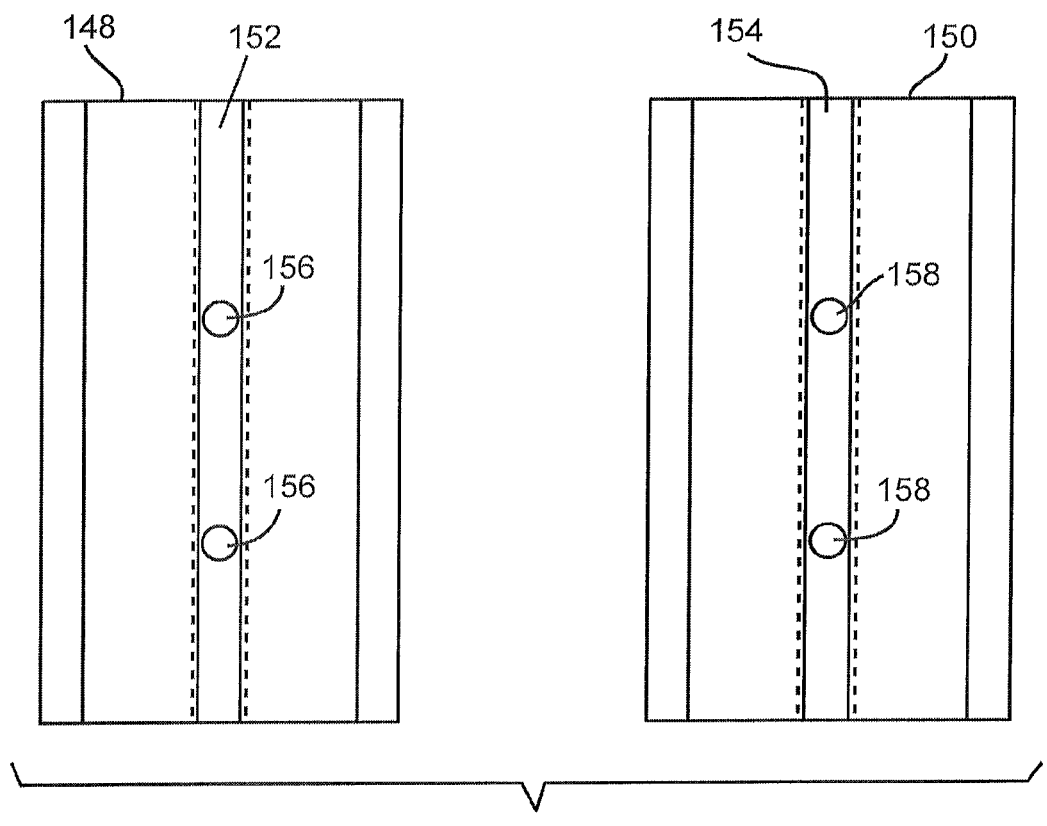
FIG. 19 is a front elevational view of two furniture members to be joined together by the coupling shown in FIG. 14.

An alternative embodiment furniture assembly 78 is shown in FIG. 7. This embodiment is similar to the furniture assembly 74 of FIG. 6. In this embodiment, a plate 80 having holes 82 is inserted in the attachment portion 76 of the first furniture member 46. Fastening devices such as screws can be inserted through the holes 82 to attach the furniture assembly 78 to another furniture assembly or structure. In an embodiment, the plate 80 is made of steel.

Referring to FIGS. 8-13, an alternative embodiment coupling 10' is shown. Referring to FIGS. 8 and 9, the first end 18' has a directional indicator such as an arrow 84 to guide the user during insertion of the coupling 10' in the first and second grooves 50 and 52. Referring to FIGS. 8-10, the first wall 22' has a first projection 86 and the second wall 24' has a second projection 88 at the second end 20'. Referring to FIGS. 8-13, the coupling 10' includes ribs 90. Referring to FIGS. 9 and 11, the first end 18' is tapered. Referring to FIG. 8, the coupling 10' includes openings 92 between the first and second walls 22' and 24'. In an embodiment, the arrow 84 is open between the first and second walls 22' and 24'. The openings 92 and the open arrow 84 decrease the amount of material needed to form the coupling 10'.

Referring to FIGS. 14-22, an alternative embodiment coupling 110 is shown. As shown in FIGS. 14-18, the coupling 110 has a center portion 112, a first portion 114, a second portion 116, a first end 118 and a second end 120. The center portion 112 has a geometric configuration, which in an embodiment is substantially rectangular. The first portion 114 has a geometric configuration, which in an embodiment is substantially rectangular. The second portion 116 has a geometric configuration, which in an embodiment is substantially rectangular. In an embodiment, the center, first and second portions 112, 114 and 116 form a substantially I-shaped configuration for the coupling 110. The coupling 110 is elongated between the first and second ends 118 and 120.

Still referring to FIGS. 14-18, the first portion 114 has a first portion flexible section 122 that bows outwardly from the coupling 110. The second portion 116 has a second portion flexible section 124 that bows outwardly from the coupling 110. A first locking member 126 is positioned on an exterior surface 128 of the first portion flexible section 122. A second locking member 130 is positioned on an exterior surface 132 of the second portion flexible section 124. The first locking member 126 extends outwardly from and is positioned on the first portion flexible section 122 at a midpoint 134. The first locking member 126 has a geometric configuration, which in an embodiment is substantially cylindrical. The second locking member 130 extends outwardly from and is positioned on the second portion flexible section 124 at a midpoint 136. The second locking member 130 has a geometric configuration, which in an embodiment is substantially cylindrical. The first and second portion flexible sections 122 and 124 are opposed to one another. The first and second locking members 126 and 130 are opposed to one another.

Referring to FIGS. 14-18, the coupling 110 has a directional indicator such as an arrow 138 at the first end 118. As shown in FIG. 15, the first and second portions 114 and 116 taper inwardly at the first end 118. As shown in FIGS. 14-16, the coupling 110 has opposed first and second projections 140 and 142 at the second end 120. As shown in FIGS. 14, 15 and 18, the coupling 110 includes one or more ribs 144. As shown in FIG. 14, the coupling has an opening 146 in the center portion 112.

Referring to FIGS. 19-22, the coupling 110 joins together a first furniture member 148 and a second furniture member 150. The first furniture member 148 includes a first member groove 152 that has a shape corresponding to the shapes of the center portion 112 and the first portion 114 of the coupling 110. The second furniture member 150 includes a second member groove 154 that has a shape corresponding to the shapes of the center portion 112 and the second portion 116 of the coupling 110. The first furniture member 148 has one or more first locking openings 156 positioned adjacent to the first member groove 152 that each has a shape corresponding to the shape of the first locking member 126. The second furniture member 150 has one or more second locking openings 158 positioned adjacent to the second member groove 154 that each has a shape corresponding to the shape of the second locking member 130.

Figure 20:
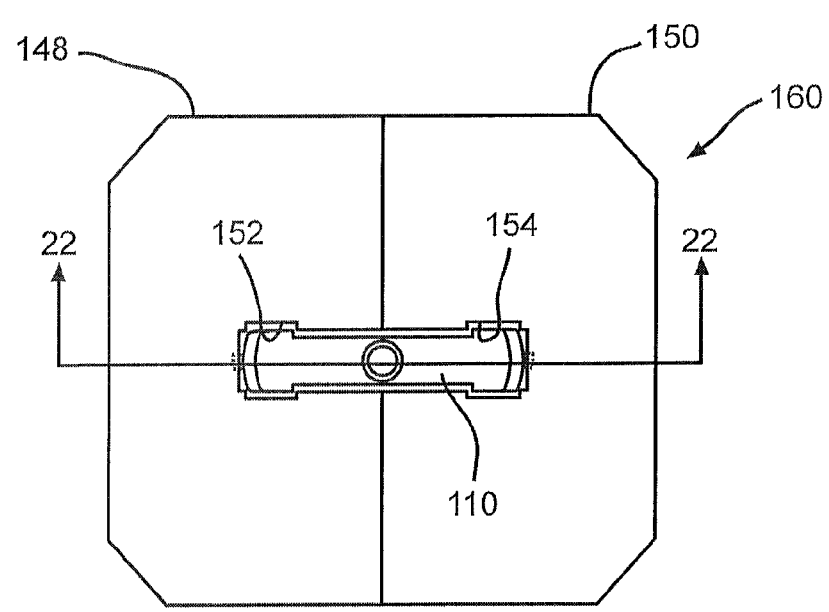
FIG. 20 is a top plan view showing two furniture members joined together by the coupling shown in FIG. 14.
Figure 21:
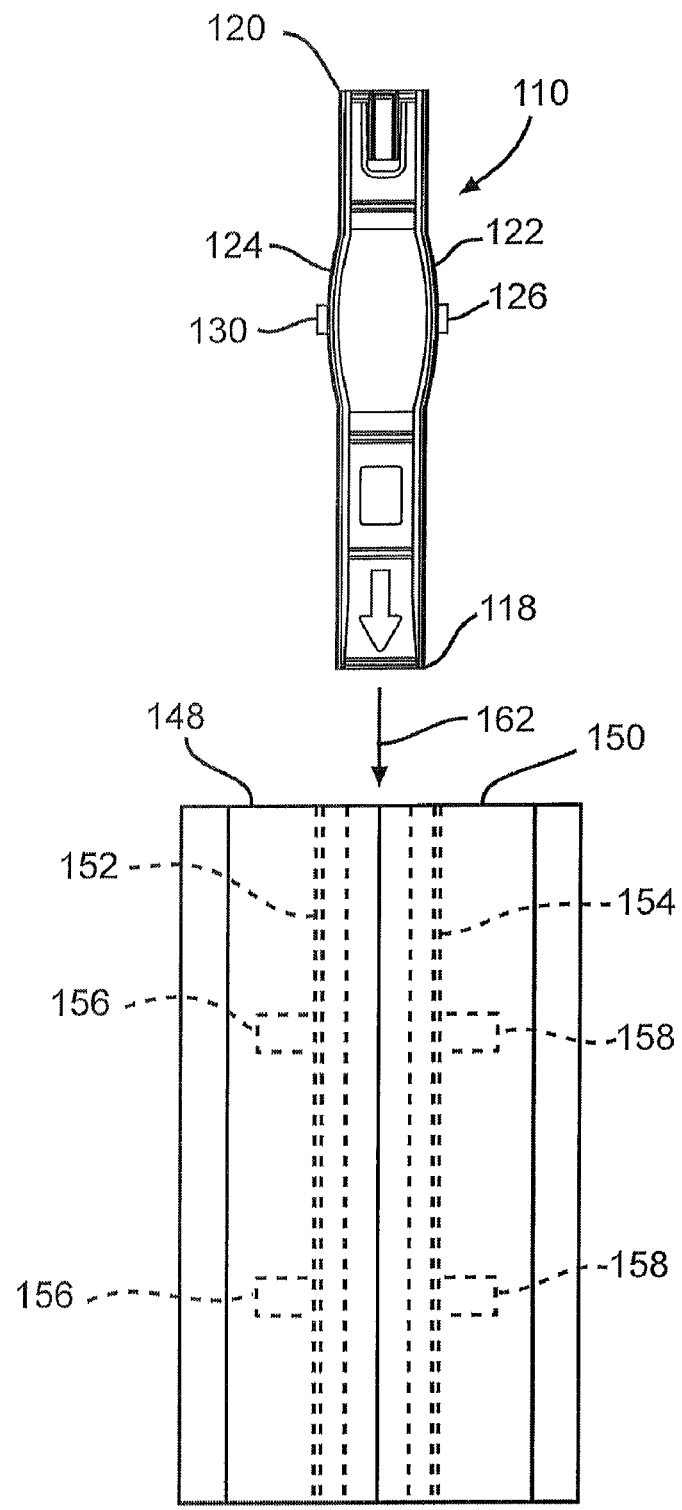
FIG. 21 is a front elevational view showing the coupling of FIG. 14 being inserted into two furniture members.
Figure 22:
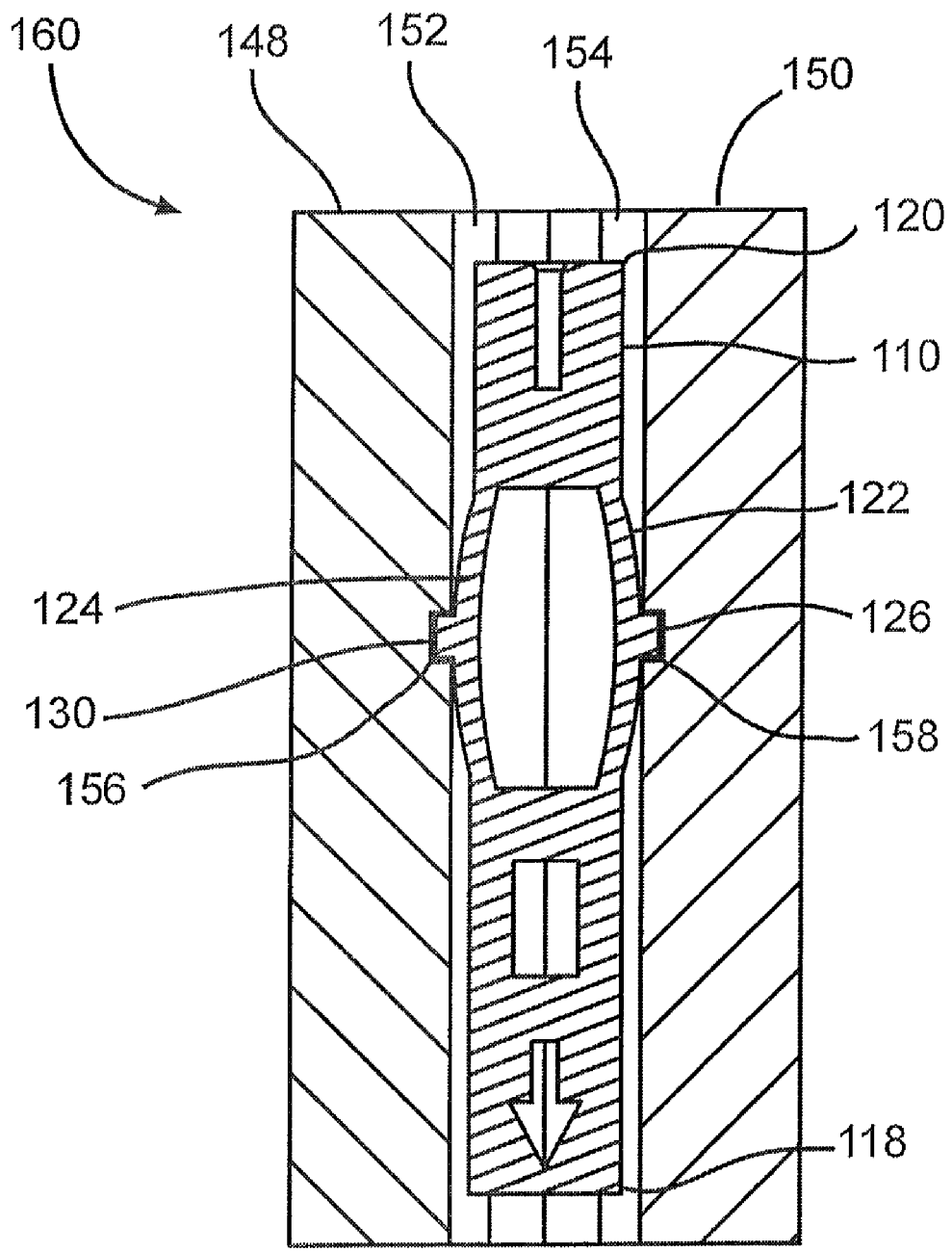
FIG. 22 is a cross-sectional view taken along line 22-22 of FIG. 20.

As shown in FIGS. 20-22, a furniture component 160 is formed by inserting the coupling 110 in the first and second member grooves 152 and 154 of the first and second furniture members 148 and 150. As shown in FIG. 21, the coupling 110 is moved in the direction indicated by the arrow 162 so that the tapered first end 118 is inserted in the first and second member grooves 152 and 154. The engagement of the first and second flexible sections 122 and 124 with the first and second furniture members 148 and 150 causes them to flex inwardly as they travel along the first and second member grooves 152 and 154. The first and second flexible sections 122 and 124 then flex outwardly once the first and second locking members 126 and 130 are positioned in the first and second locking openings 156 and 158, respectively. In this position, the coupling 110 acts to join together the first and second furniture members 148 and 150 to form the furniture component 160.

While the invention has been described with reference to particular embodiments, it should be understood that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiments, but that the invention shall include all embodiments falling within the scope of the claims.

What is claimed is:

1. A furniture coupling assembly comprising:

a coupling extending longitudinally between first and second ends and having a generally I-shaped cross-sectional configuration formed by generally parallel first and second plates and a center plate extending between the first and second plates, the first and second plates being tapered in the longitudinal direction at the first end of the coupling, the first plate having a first plate flexible section outwardly bowing from the coupling in a direction opposing the center plate, a first locking member having a generally cylindrical shape being positioned at a midpoint on an exterior surface of the first plate flexible section and extending longitudinally in a direction opposing the center plate, the second plate having a second plate flexible section outwardly bowing from the coupling in a direction opposing the center plate, a second locking member having a generally cylindrical shape being positioned at a midpoint on an exterior surface of the second plate flexible section and extending longitudinally in a direction opposing the center plate, the first and second flexible members being opposed to one another, the center plate having a directional indicator positioned adjacent to the first end of the coupling;

a first furniture member having a first member groove having a cross-sectional shape corresponding to the cross-sectional configuration of one of the first and second plates of the coupling, the first furniture member having a first locking opening positioned adjacent to the first member groove and having a generally cylindrical shape corresponding to the generally cylindrical shape of one of the first and second locking members; and a second furniture member having a second member groove having a cross-sectional shape corresponding to the cross-sectional configuration of the other of the first and second plates of the coupling, the second furniture member having a second locking opening positioned adjacent to the second member groove and having a generally cylindrical shape corresponding to the generally cylindrical shape of the other of the first and second locking members, the coupling being insertable in the first and second furniture member grooves in the direction indicated by the directional indicator and the first and second locking members being insertable in the first and second locking openings to join together the first and second furniture members.

2. The assembly of claim 1, wherein the second end has a projection positioned on the center plate.

3. The assembly of claim 1, wherein the coupling includes a rib positioned on the center plate.

4. The assembly of claim 1, wherein the coupling is inserted in the first and second member grooves of the first and second furniture members to form a furniture component.

5. The assembly of claim 4, wherein the first and second furniture members are substantially rectangular and when joined together form a substantially square furniture component.

6. The assembly of claim 4, wherein the first and second furniture members are substantially semi-circular and when joined together form a substantially round furniture component.

* * * * *